United States Patent
Ansari

(10) Patent No.: US 10,334,313 B2
(45) Date of Patent: *Jun. 25, 2019

(54) CENTRALIZED BROADBAND GATEWAY FOR A WIRELESS COMMUNICATION SYSTEM

(71) Applicant: AT&T Intellectual Property I, L.P., Atlanta, GA (US)

(72) Inventor: Ahmad Ansari, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/940,241

(22) Filed: Mar. 29, 2018

(65) Prior Publication Data

US 2018/0220188 A1 Aug. 2, 2018

Related U.S. Application Data

(63) Continuation of application No. 15/254,632, filed on Sep. 1, 2016, now Pat. No. 9,961,397, which is a
(Continued)

(51) Int. Cl.
*H04N 21/4367* (2011.01)
*H04N 21/4363* (2011.01)
(Continued)

(52) U.S. Cl.
CPC ....... *H04N 21/43637* (2013.01); *H04N 19/90* (2014.11); *H04N 21/258* (2013.01);
(Continued)

(58) Field of Classification Search
CPC ........... H04N 21/43637; H04N 21/258; H04N 21/4122; H04N 21/43635; H04N 21/440218; H04N 19/90; H04W 88/16
See application file for complete search history.

(56) References Cited

U.S. PATENT DOCUMENTS 8,406,241 B2 3/2013 Ansari et al.
9,001,838 B2 4/2015 Ansari
(Continued)

OTHER PUBLICATIONS

Smith, "Belkin Prices Up Delayed Wireless HDMI Box", Register Hardware, Jul. 10th, 2008, http://www.reghardware.co.uk/2008/07/10/belkin_prices_flywire/.

*Primary Examiner* — Habte Mered
(74) *Attorney, Agent, or Firm* — Guntin & Gust, PLC; Ralph Trementozzi

(57) ABSTRACT

A system that incorporates teachings of the present disclosure may include, for example, a centralized broadband gateway for a wireless communication system, including a router/gateway module which receives encoded compressed audio/video (A/V) streams and distributes the encoded compressed audio/video A/V streams; multiple audio/video decoders which receive the encoded compressed A/V streams from the a router/gateway module, decode the encoded compressed A/V streams, and output uncompressed A/V streams; and an integrated Wireless High Definition Multimedia Interface (WHDMI) which receives the uncompressed A/V streams from the multiple audio/video decoders and transmits the uncompressed A/V streams wirelessly to media devices, without deploying individual media processors at each media device. Other embodiments are disclosed.

20 Claims, 7 Drawing Sheets

Related U.S. Application Data continuation of application No. 14/641,977, filed on Mar. 9, 2015, now Pat. No. 9,462,299, which is a continuation of application No. 13/771,189, filed on Feb. 20, 2013, now Pat. No. 9,001,838, which is a continuation of application No. 12/617,873, filed on Nov. 13, 2009, now Pat. No. 8,406,241.

(51) Int. Cl.
| | | |
|---|---|---|
| *H04N 21/258* | (2011.01) | |
| *H04N 21/41* | (2011.01) | |
| *H04N 21/4402* | (2011.01) | |
| *H04N 19/90* | (2014.01) | |
| *H04W 88/16* | (2009.01) | |

(52) U.S. Cl.
CPC ... *H04N 21/4122* (2013.01); *H04N 21/43635* (2013.01); *H04N 21/440218* (2013.01); *H04W 88/16* (2013.01)

(56) References Cited

U.S. PATENT DOCUMENTS

| | | |
|---|---|---|
| 2006/0209890 A1 | 9/2006 | MacMullan et al. |
| 2008/0168312 A1 | 7/2008 | Banks et al. |
| 2011/0030025 A1 | 2/2011 | Bertonis et al. |
| 2011/0078721 A1 | 3/2011 | Wang |
| 2016/0373810 A1 | 12/2016 | Ansari |

200

500

CENTRALIZED BROADBAND GATEWAY FOR A WIRELESS COMMUNICATION SYSTEM

CROSS-REFERENCE TO RELATED APPLICATIONS

This application is a Continuation of U.S. patent application Ser. No. 15/254,632, filed Sep. 1, 2016, which is a Continuation of and claims priority to U.S. patent application Ser. No. 14/641,977 (now U.S. Pat. No. 9,462,299), filed Mar. 9, 2015, which is a Continuation of and claims priority to U.S. patent application Ser. No. 13/771,189 (now U.S. Pat. No. 9,001,838), filed Feb. 20, 2013, which is a Continuation of and claims priority to U.S. patent application Ser. No. 12/617,873 (now U.S. Pat. No. 8,406,241), filed Nov. 13, 2009. The contents of each of the foregoing are hereby incorporated by reference into this application as if set forth herein in full.

FIELD OF THE DISCLOSURE

The present disclosure relates generally to wireless communications and, more specifically, to a centralized broadband gateway for a wireless communication system.

BACKGROUND OF THE DISCLOSURE

Communication systems and electronic systems normally comprise a plurality of separate components that are coupled together by cabling. For example, cables are used for connecting television (TV) sets to cable set-top boxes (STBs), as well as for connecting various other devices utilized in a system. However, relying on cables can become cumbersome and unsightly when the number of cables increases to handle various components and peripheral devices. Also, popular wall mounted High Definition TV (HDTV) sets have the unsightly cable(s) hanging or extending from below the TV set and therefore are not aesthetically pleasing to the eye.

DETAILED DESCRIPTION OF THE DRAWINGS

One embodiment of the present disclosure can entail a centralized broadband gateway for a wireless communication system, including: a router/gateway module which receives encoded compressed audio/video (A/V) streams and distributes the encoded compressed audio/video A/V streams; multiple audio/video decoders which receive the encoded compressed A/V streams from the a router/gateway module, decode the encoded compressed A/V streams, and output uncompressed A/V streams; and an integrated Wireless High Definition Multimedia Interface (WHDMI) which receives the uncompressed A/V streams from the multiple audio/video decoders and transmits the uncompressed A/V streams wirelessly to media devices, without deploying individual media processors at each media device.

Another embodiment of the present disclosure can entail a computer-readable storage medium, including computer instructions for instructing a communication system to: receive encoded compressed A/V streams from a broadband connection; distribute the encoded compressed A/V streams to multiple audio/video decoders which decode the encoded compressed A/V streams and which output uncompressed A/V streams; and transmit the uncompressed A/V streams wirelessly to multiple High Definition Television (HDTV) sets, without deploying individual media processors at each HDTV set.

Yet another embodiment of the present disclosure can entail a method of providing wireless communications from a centralized broadband gateway, including: receiving encoded compressed A/V streams from a broadband connection; distributing the encoded compressed audio/video A/V streams to multiple audio/video decoders which decode the encoded compressed A/V streams and which output uncompressed A/V streams; and transmitting the uncompressed A/V streams wirelessly to multiple HDTV sets, without deploying individual media processors at each HDTV set.

Figure 1:
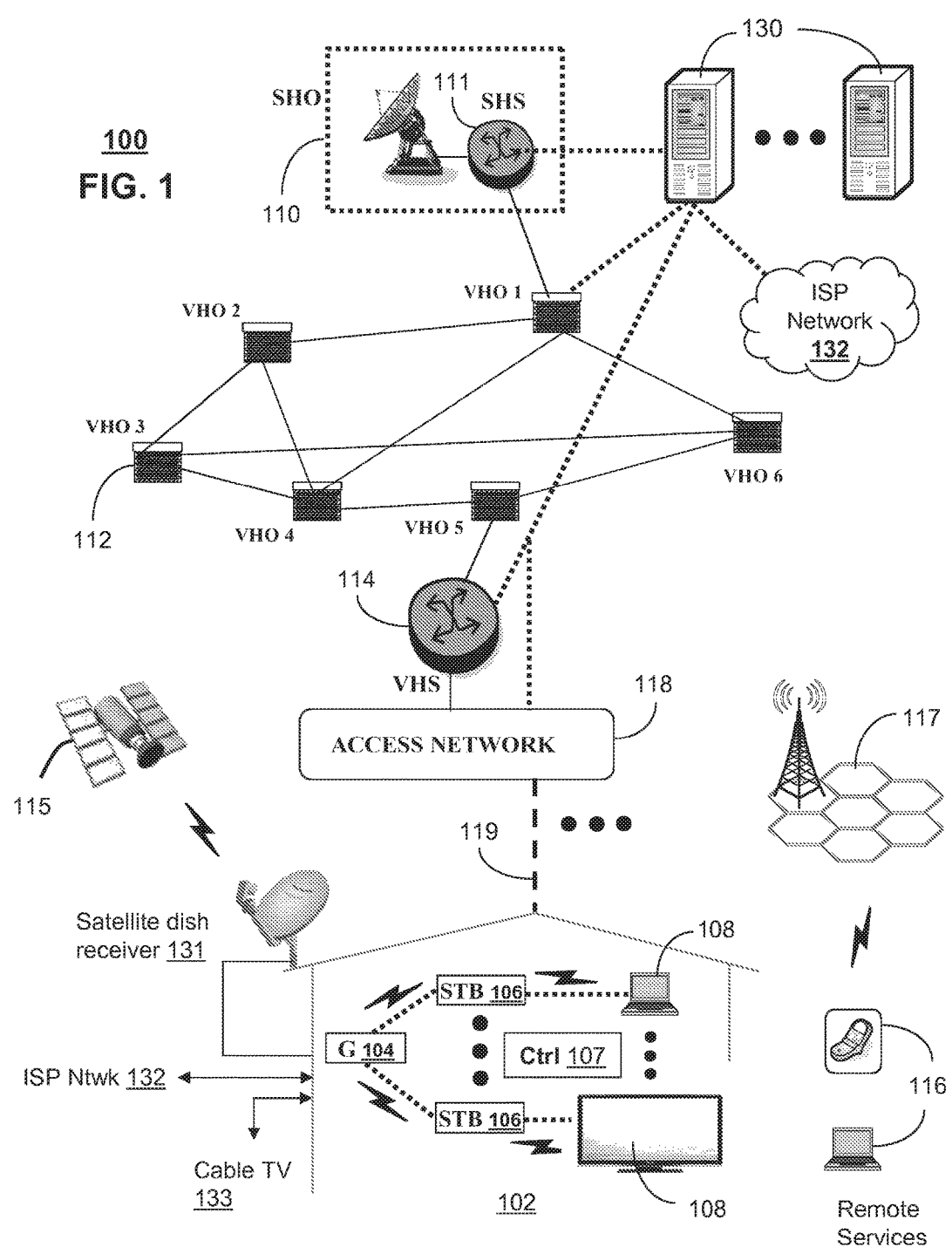
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
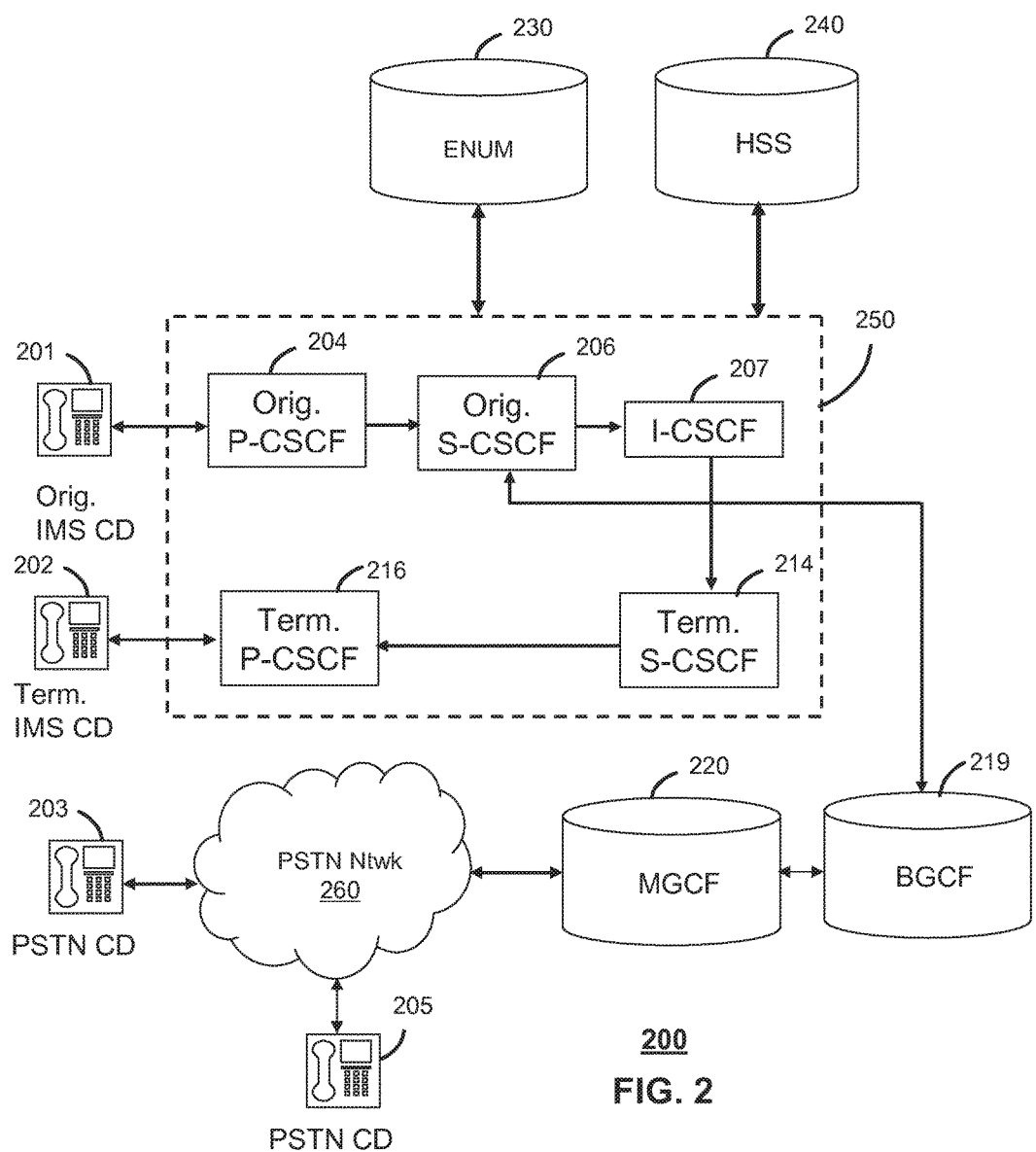

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
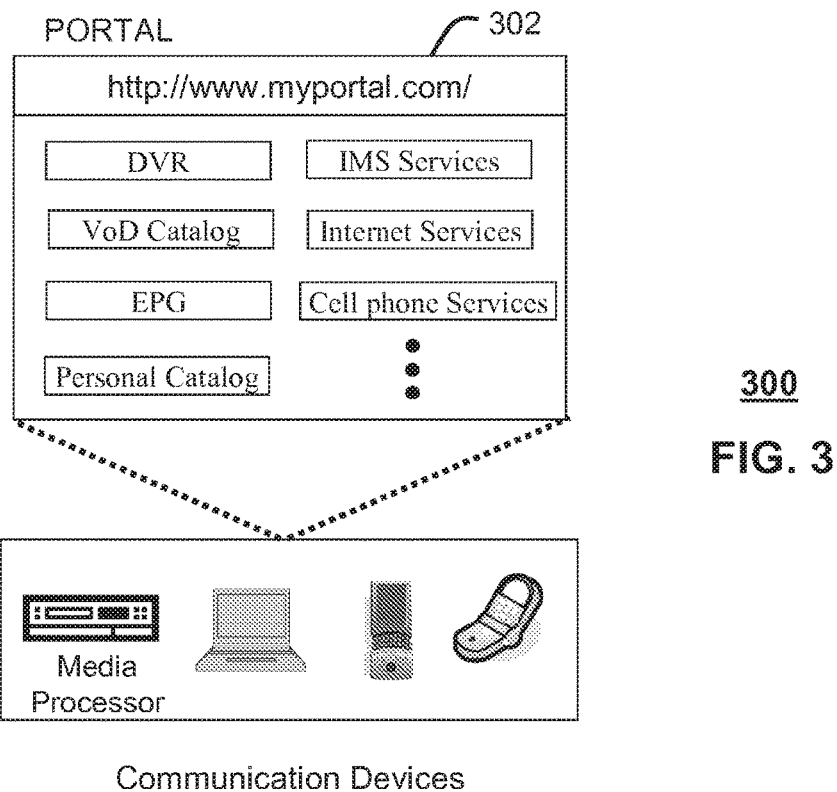
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
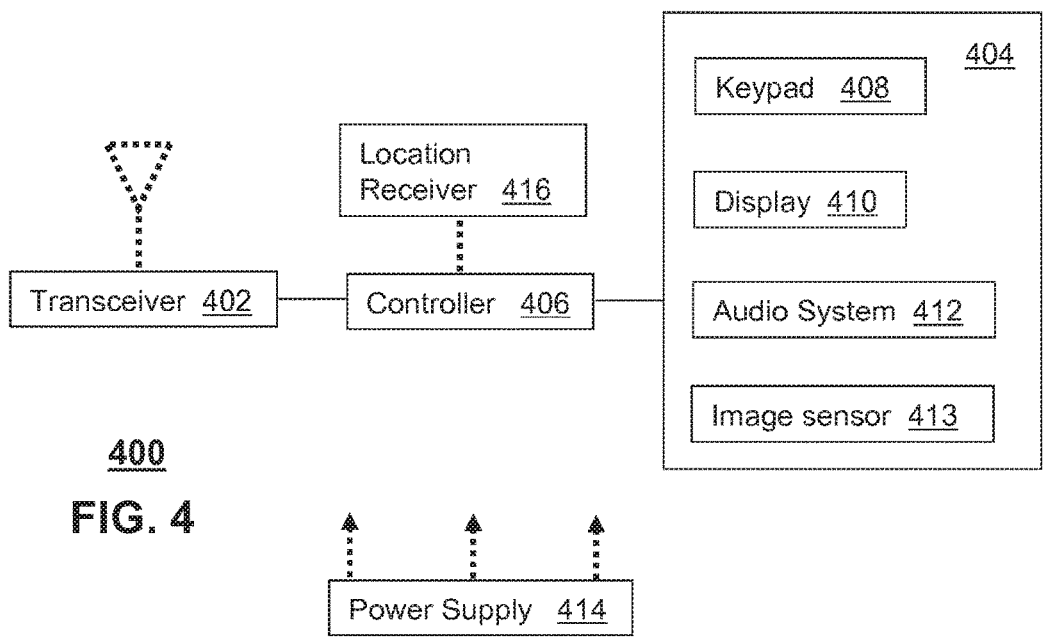
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
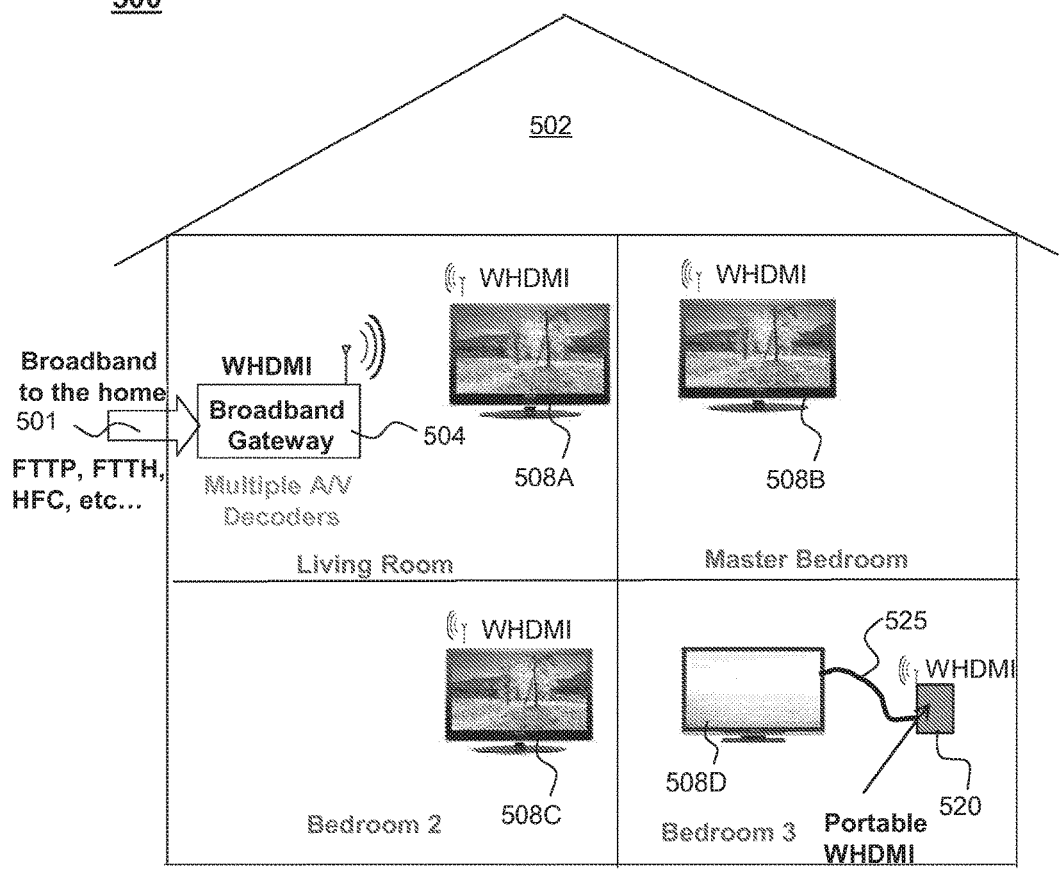
FIG. 5 depicts an illustrative embodiment of a centralized broadband gateway for a wireless communication system operating in portions of the communication systems of FIGS. 1 and 2.

FIG. 5 depicts an illustrative embodiment of a centralized broadband gateway 504 for a wireless communication system 500 operating in portions of the communication systems of FIGS. 1 and 2. More specifically, FIG. 5 shows a more detailed view of the commercial and/or residential buildings 102 shown in FIG. 1. Note that like references numerals denote like elements, except that a "5" precedes the numeral rather than a "1" (e.g., the commercial and/or residential building 102 is labeled as 502). As will be discussed in more detail below, the centralized broadband gateway 504 comprises, for example, a multimedia home gateway with an integrated Wireless High Definition Multimedia Interface (WHDMI). The centralized broadband gateway 504 allows the transport of uncompressed high definition (HD) and standard definition (SD) video streams to, for example, one or more HDTV sets 508A, 508B, and 508C that have an integrated Wireless High Definition Multimedia Interface (WHDMI) interface, or to an HDTV set 508D without an integrated WHDMI and which thus includes an external WHDMI device such as a portable WHDMI adapter 520 as a receiver. The external WHDMI adapter 520 may be connected to the HDTV 508D by an HDMI cable 525.

HDMI is a digital audio/video interface standard used for connecting audio/visual equipment such as HDTV sets to cable STBs, DBS satellite STBs, IPTV STBs and other devices such as home theater systems. With 19 wires wrapped in a single cable that resembles a USB wire, HDMI is able to carry a bandwidth of 5 gigabits per second (Gbps). HDMI is becoming the primary interface for connecting HDTV sets to HDMI compliant devices. The existing HDMI standard is designed for wired connections between devices. WHDMI enables the transmission of uncompressed high quality HDTV streams to be sent to devices that could support WHDMI. The present invention contemplates using, for example, Ultra-Wideband (UWB) and 802.11n extensions to transmit a significantly large amount of data to display devices with either built-in WHDMI interfaces or external WHDMI devices that are connected to television monitors. The UWB technology was designed initially to be used at very low energy levels for short-range high-bandwidth communications by using a large portion of the radio spectrum. However, UWB in WHDMI is capable of high data rate transmission of over 1 Gbps at distances of more than 60 feet through walls. Other wireless communications may be used such as, for example, a Wireless Local Area Network (WLAN) operating in accordance with existing standards or future standards or derivatives thereof.

Heretofore, existing systems have been unsuccessful at transmitting uncompressed Standard Definition (SD) or High Definition (HD) video over a home network. One reason for this is the lack of adequate bandwidth on a typical wired or wireless home network. In an embodiment consistent with the present invention, the centralized broadband gateway 504 may comprise multiple audio/video (A/V) decoders and can transmit uncompressed or losslessly compressed video over the WHDMI interface to multiple television sets in, for example, the home. By using a centralized home gateway architecture, television sets will no longer require dedicated digital decoder STBs. In an embodiment consistent with the present invention, HDTV sets with integrated WHDMI receive video through the integrated interface, and existing HDTV sets that do not have a WHDMI interface receive the uncompressed or losslessly compressed audio/video (A/V) stream through external WHDMI devices.

In FIG. 5, the high level block diagram shows the centralized broadband gateway 504 with multiple (for example, four) A/V decoders and an integrated WHDMI interface. As shown in FIG. 5, the centralized broadband gateway 504 may be used in any broadband access technology 501 (e.g., fiber-to-the-home (FTTH), fiber-to-the-premises (FTTP), and hybrid fiber-coaxial (HFC)). The centralized broadband gateway 504 receives multiple HD and SD compressed streams. Each compressed stream is decoded by the one of the multiple A/V decoders in the centralized broadband gateway 504 and the uncompressed or losslessly recompressed stream is transmitted to a corresponding television set 508A-C with an integrated WHDMI interface (Living Room, Master Bedroom, Bedroom 2) or to the external WHDMI receiver 520 that is connected to the television set 508D using the standard HDMI cable 525 (Bedroom 3). At each television location, only an RF remote control is needed to communicate with the centralized broadband gateway 504 for interacting (changing channel, browsing the GUIDE, etc. . . . ). With the gateway architecture consistent with the present invention, there is no longer a need for deploying individual STBs at the location of each of the television sets. High quality audio and video is received by WHDMI devices without the need to decode them, or, as discussed in more detail below, low-complexity, low-delay and very cost effective compression techniques can be used to transmit video wirelessly throughout the home. This approach eliminates expensive STBs that otherwise would be required. It will also enables the self-installation of IPTV services.

Figure 6:
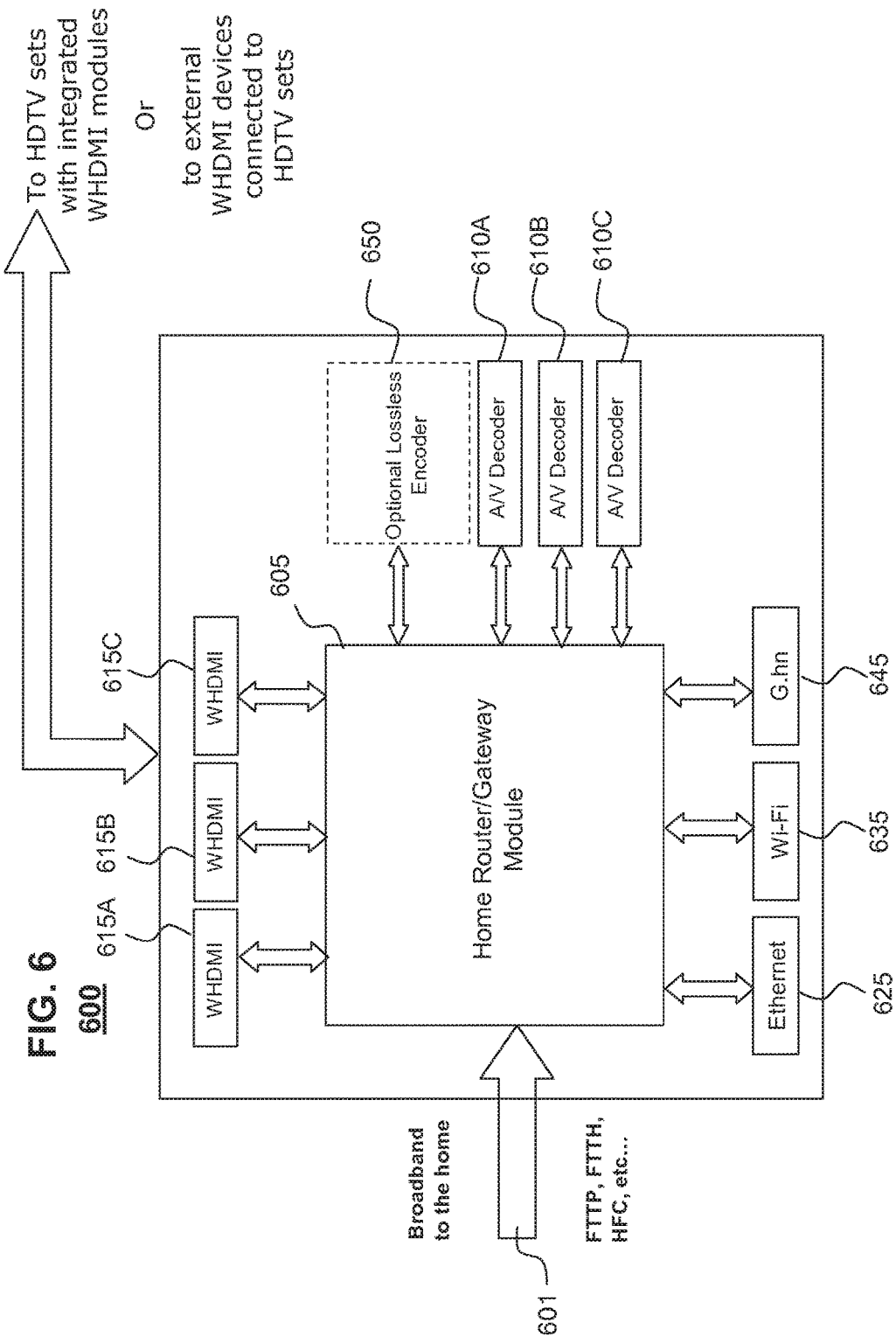
FIG. 6 is a schematic view of an illustrative embodiment of a centralized broadband gateway operating in portions of the communication systems of FIGS. 1, 2 and 5.

FIG. 6 is a schematic view of an illustrative embodiment of a centralized broadband gateway 600 (corresponding to centralized broadband gateway 504 shown in FIG. 5) operating in portions of the communication systems of FIGS. 1, 2 and 5. As noted above, encoded compressed A/V streams are delivered to the centralized broadband gateway 600 through a broadband connection 601 such as the FTTP, FTTH, HFC, or the like. The encoded compressed A/V streams are delivered to a home router/gateway module 605 of the centralized broadband gateway 600. The home router/gateway module 605 distributes the encoded compressed A/V streams to corresponding A/V decoder modules 610A, 610B, 610C. While three A/V decoder modules 610A-C are shown in FIG. 6, the centralized broadband gateway 600 is not limited to this configuration and can have more or less than three. For example, the centralized broadband gateway 504 shown in FIG. 5 has four A/V decoder modules, or one for each TV situated throughout the residential building 502. Moreover, the separate A/V decoder modules 610A-C can also be combined into a single unit that can distribute each of the streams to the respective wireless HDMI modules 615A, 615B, 615C. The A/V decoder modules 610A-C decode the encoded compressed A/V streams and send or output the uncompressed or losslessly compressed streams to the respective wireless HDMI modules 615A, 615B, 615C. The wireless HDMI modules 615A, 615B, 615C transmit the A/V streams wirelessly to either HDTV sets with integrated WHDMI modules (see, for example, TVs 508A-C in FIG. 5), or to external WHDMI devices connected to HDTV sets (see, for example, TV 508D using the portable WHDMI 520 in bedroom 3 as shown in FIG. 5). Each WHDMI module in the home router/gateway module 605 can be configured to transmit its corresponding A/V stream to a specific end device (e.g., HDTV set or external WHDMI devices). Moreover, like the A/V decoders, the wireless HDMI modules 615A, 615B, 615C can be combined into a single unit which transmits the corresponding A/V streams to each of the specific end devices (e.g., HDTV set or external WHDMI devices).

The home router/gateway module 605 can have other network interfaces such as Ethernet 625, Wi-Fi 635, G.hn ("next generation" home network) 645, for example, used for data networking within the home.

In order to make use of the WHDMI bandwidth more efficiently, an embodiment of the present invention may make use of low complexity and low delay lossless video compression schemes that allow the transport of multiple HD streams to devices with WHDMI interfaces in, for example, the home. In this way, optimal use is made of the bandwidth over the wireless link. There are a number of very low-complexity and low-delay video compression algorithms such as Bit Plane Encoding or lossless Predictive Coding that may be used to compress video without any loss. The low-delay, low-complexity lossless video compression techniques are also cost effective. Thus, an optional lossless encoder 650 can be included which encodes the decoded A/V streams losslessly resulting in losslessly compressed A/V streams.

Figure 7:
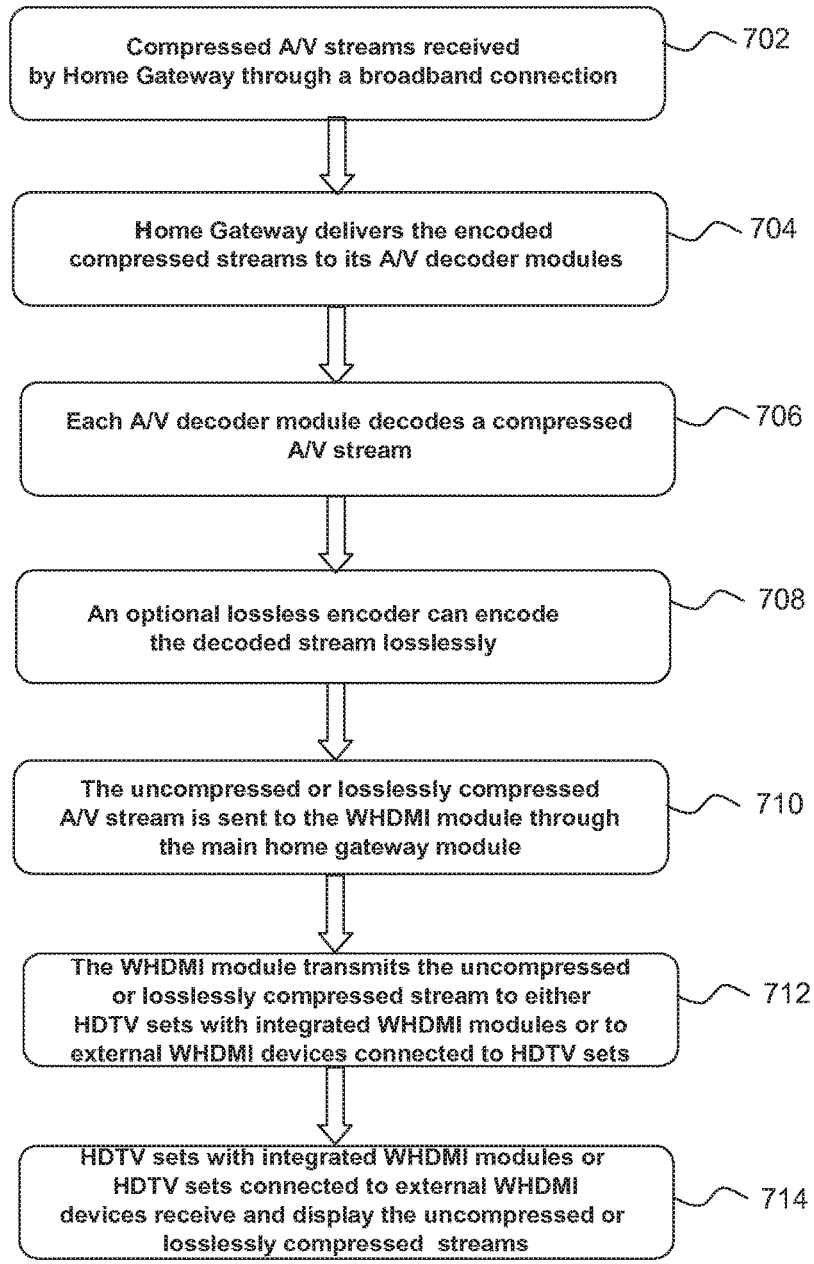
FIG. 7 depicts an illustrative embodiment of a method operating in portions of the communication systems of FIGS. 1-2.

FIG. 7 depicts an illustrative method 700 that operates in portions of the communication system/wireless communication system of FIGS. 1, 2 and 5. Method 700 can begin with step 702 in which compressed A/V streams are received by the centralized broadband gateway (504, 600) through a broadband connection (501, 601). In step 704, the home router/gateway module 605 delivers the encoded compressed streams to the various A/V decoder modules 610A-C. In step 706, each A/V decoder module 610A-C decodes an encoded compressed A/V stream. An optional lossless encoder 650 can encode the decoded stream losslessly, as at step 708. At step 710, the uncompressed or losslessly compressed A/V stream is sent to the corresponding WHDMI modules 615A-C through the main home router/gateway module 605. At step 712, each of the WHDMI modules 615A-C transmits its uncompressed or losslessly compressed stream to either HDTV sets with integrated WHDMI modules or to external WHDMI devices connected to HDTV sets. At step 714, the HDTV sets with integrated WHDMI modules, or the HDTV sets connected to corresponding external WHDMI devices, receive and display the uncompressed or losslessly compressed streams.

Based on the foregoing, some of the benefits of the centralized broadband gateway consistent with the present invention include: 1) wireless transmission of high quality either uncompressed or losslessly encoded HD/SD video with a low complexity, low delay and low cost encoder; 2) no HDMI wire/cable is required; 3) enables existing HDTV sets with wired HDMI interface to receive HDMI video wirelessly; 4) no need to deploy individual STBs at each television location; 5) enables self-installation of IPTV services; and 6) enables the transmission of an HDTV signal to HDTV sets from a centralized gateway without requiring to deploy dedicated STBs at each television location.

Upon reviewing the aforementioned embodiments, it would be evident to an artisan with ordinary skill in the art that said embodiments can be modified, reduced, or enhanced without departing from the scope and spirit of the claims described below. For example, the centralized broadband gateway consistent with the present invention can be deployed by various cable, direct broadcast satellite (DBS), IPTV, and other entertainment service providers.

Other suitable modifications can be applied to the present disclosure without departing from the scope of the claims below. Accordingly, the reader is directed to the claims section for a fuller understanding of the breadth and scope of the present disclosure.

Figure 8:
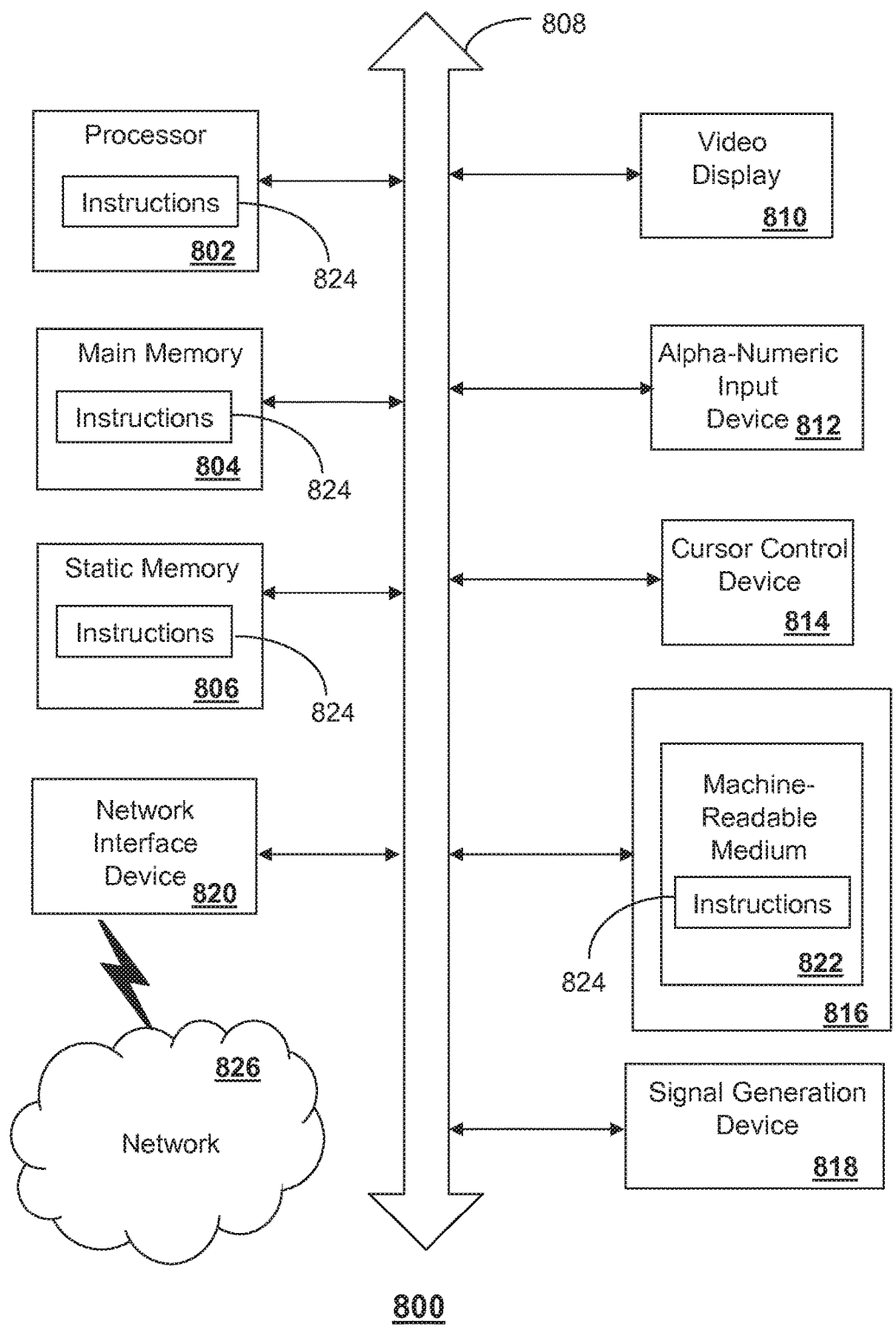
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A gateway, comprising:
a processing system including a processor; and
a memory that stores executable instructions that, when executed by the processing system, facilitate performance of operations, the operations comprising:
receiving encoded compressed media streams;
decoding the encoded compressed media streams to generate uncompressed media streams;
providing the uncompressed media streams to a plurality of media devices, wherein each media device of the plurality of media devices comprises a wireless high definition multimedia interface to receive an uncompressed media stream of the uncompressed media streams; and receiving an input from a remote control associated with one media device of the plurality of media devices to adjust a corresponding uncompressed media stream directed to the one media device.

2. The gateway of claim 1, further comprising:

a wireless fidelity network interface that transmits data for data networking; and a plurality of audio/video decoders that provide the uncompressed media streams to each media device of the plurality of media devices, wherein the plurality of audio/video decoders each comprise a bit plane encoding encoder.

3. The gateway of claim 1, wherein the remote control communicates with the gateway via a radio frequency transmission to provide the input.

4. The gateway of claim 1, further comprising:

an Ethernet network interface that transmits data for data networking; and a media decoder that provides the uncompressed media stream to a corresponding media device of the plurality of media devices based on the encoded compressed media streams.

5. The gateway of claim 4, wherein the media decoder comprises a lossless predictive coding encoder.

6. The gateway of claim 1, wherein the operations further comprise receiving an additional input from an additional remote control associated with a different media device of the plurality of media devices to adjust an additional uncompressed media stream of the uncompressed media streams directed to the different media device.

7. The gateway of claim 1, wherein the operations further comprise adjusting the uncompressed media stream directed to the one media device according to the input.

8. The gateway of claim 1, wherein a respective uncompressed media stream is displayed without accessing a media processor at a respective media device of the plurality of media devices.

9. The gateway of claim 1, wherein the encoded compressed media streams includes high-definition content and standard-definition content.

10. The gateway of claim 1, wherein one media device of the plurality of media devices comprises an external wireless high definition multimedia interface provided thereto.

11. A non-transitory, machine-readable storage medium, comprising executable instructions that, when executed by a processing system including a processor of a gateway, facilitate performance of operations, the operations comprising:

distributing, by the gateway, encoded compressed media streams to multiple media bit plane decoders of the gateway, wherein the multiple media bit plane decoders generate a first set of uncompressed media streams and a second set of uncompressed media streams;

wirelessly transmitting, by a plurality of wireless high definition multimedia interfaces of the gateway, the first set of the uncompressed media streams to a first media device; and wirelessly transmitting, by the plurality of wireless high definition multimedia interfaces of the gateway, the second set of the uncompressed media streams to a second media device, wherein an input from a remote control associated with one media device from among the first media device and the second media device is received to adjust an uncompressed media stream directed to that one media device.

12. The non-transitory, machine-readable storage medium of claim 11, wherein the operations further comprise receiving the encoded compressed media streams containing media content from a service provider via a broadband connection.

13. The non-transitory, machine-readable storage medium of claim 11, wherein the first media device comprises a first wireless high definition multimedia interface to receive the first set of the uncompressed media streams, and wherein the first set of the uncompressed media streams is displayed without accessing a media processor at the first media device.

14. The non-transitory, machine-readable storage medium of claim 11, wherein the second media device comprises a second wireless high definition multimedia interface to receive the second set of the uncompressed media streams, wherein a second remote control is associated with the second media device and the gateway, and wherein the second set of the uncompressed media streams is displayed without accessing a media processor at the second media device.

15. The non-transitory, machine-readable storage medium of claim 11, wherein the encoded compressed media streams includes high-definition content and standard-definition content.

16. The non-transitory, machine-readable storage medium of claim 11, wherein the multiple media bit plane decoders further generate a set of losslessly compressed media streams, wherein the gateway wirelessly transmits the set of losslessly compressed media streams to a third media device, wherein the third media device is associated with a third remote control device via the gateway to control the set of losslessly compressed media streams for the third media device, and wherein the third media device comprises a third wireless high definition multimedia interface to receive the set of losslessly compressed media streams, and wherein the set of losslessly compressed media streams is displayed without accessing a media processor at the third media device.

17. A method, comprising:

distributing, by a gateway comprising a processing system including a processor, media streams received from a service provider to multiple media decoders of the gateway;

generating, by a multiple media decoders of the gateway, uncompressed media streams, wherein the uncompressed media streams include a first set of signals and a second set of signals, wherein the first set of signals comprise a first uncompressed video signal including first media content, and wherein the second set of signals comprise a second losslessly compressed video signal including second media content;

wirelessly transmitting, by a first wireless high definition multimedia interface of the gateway, the first set of signals to a first high definition television set, wherein the first high definition television set receives the first set of signals via a first wireless high definition multimedia interface;

wirelessly transmitting, by a second wireless high definition multimedia interface of the gateway, the second set of signals to a second high definition television set, wherein the second high definition television set receives the second set of signals via a second wireless high definition multimedia interface; and receiving, by the gateway, an input from a remote control associated with one of the first high definition television set and the second high definition television set to adjust an uncompressed media stream directed to the one of the first high definition television set and the second high definition television set.

18. The method of claim 17, wherein the first high definition television set receives the first set of signals directly though the first wireless high definition multimedia interface without additional processing of the first set of signals to display content of the first set of signals.

19. The method of claim 17, further comprising adjusting, by the multiple media decoders of the gateway, the uncompressed media streams according to the input from the remote control.

20. The method of claim 19, wherein the multiple media decoders of the gateway comprise a lossless encoder and an uncompressed encoder, and wherein the lossless encoder uses low complexity and low delay lossless video compression protocols.

* * * * *